United States Patent [19]

Mekosh, Jr. et al.

[11] 4,286,797
[45] Sep. 1, 1981

[54] PIN RETRACTING MECHANISM FOR A TRAILER

[75] Inventors: George Mekosh, Jr., Warrington; David O. Hulse, Lionville, both of Pa.

[73] Assignee: The Budd Company, Troy, Mich.

[21] Appl. No.: 77,898

[22] Filed: Sep. 24, 1979

[51] Int. Cl.³ ............................................. B60G 5/06
[52] U.S. Cl. ............................ 280/80 B; 105/199 R
[58] Field of Search ............ 280/80 B, 104; 105/165, 105/215 C, 199 R, 422; 188/56, 57

[56] References Cited

U.S. PATENT DOCUMENTS

| | | | |
|---|---|---|---|
| 2,818,272 | 12/1957 | De Lay | 280/80 B X |
| 2,888,297 | 5/1959 | Ridgway | 280/80 B |
| 2,962,295 | 11/1960 | Tenenbaum | 280/80 B |
| 3,177,002 | 4/1965 | Schmidt | 280/80 B |
| 3,931,987 | 1/1976 | Holliday | 280/80 B |
| 3,963,259 | 6/1976 | Massey | 280/80 B |

Primary Examiner—Joseph F. Peters, Jr.
Assistant Examiner—Norman L. Stack, Jr.
Attorney, Agent, or Firm—A. L. Trueax, Jr.

[57] ABSTRACT

A power actuating mechanism uses a mechanical spring to normally urge a pin through openings in a track and rail of a trailer and bogie, respectively, to lock the trailer to the bogie. Structure is provided to selectively apply air pressure to an actuator to overcome the bias of the mechanical spring and move the pin out of the opening in the track of the trailer to unlock the bogie from the trailer for repositioning or removal.

8 Claims, 3 Drawing Figures

PIN RETRACTING MECHANISM FOR A TRAILER

Trailer systems involving slidable bogies are well known. In general, it is often desirable to reposition the bogie under the trailer to accommodate load changes on the axle or for shortening the turning radius.

The bogie, which includes wheels, brakes, subframe, suspension and other items, is attached to the trailer by a positive locking mechanism. This locking mechanism on the bogie generally includes two or four heavy steel pins to secure the bogie in a fore and aft direction to the trailer box. The bogie includes a pair of rails which slide in a pair of tracks on the trailer which guide them.

The vertical edges of the tracks on the trailer have a series of equally spaced holes on each side so that the pins on the bogie can enter selected one of the holes in the track to establish a locked position underneath the trailer box. The holes may be spaced at three, four or six inch intervals with the sliding range of the bogie being about eight feet. During a repositioning of the trailer with respect to the bogie, the pins are manually removed by an operator pulling a rod which operates through a lever system to overcome spring pressure to remove the pins.

In a copending application entitled "AN INTERLOCK SYSTEM FOR A TRAILER AND BOGIE", filed Sept. 24, 1979, Ser. No. 77,897, and assigned to the same assignee as the present invention, there is described means to assure that the trailer cannot be operated unless the pin elements on the bogie are locked in place to the trailer. While the present invention, in one form, includes this feature, the details relating thereto are not redescribed herein.

Frequently, in systems as described above, as the sliding mechanisms in the trailers become older and worn as a result of normal operation, the bogie pins may tend to become jammed in the holes of the tracks of the trailer. This jamming may also result for a slight misalignment of the pins of the bogie and the holes in the tracks. As a result, the normal manual pulling of the rod does not produce enough force to remove the pins to unlock the bogie from the trailer.

It is an object of this invention to provide a novel actuating power means for selectively withdrawing a pin element from a locking position between a trailer and a bogie.

It is still a further object of this invention to provide a novel actuating power means for selectively withdrawing a pin element from a locking position between a trailer and a bogie, which utilizes much of the mechanism of existing trailers.

In accordance with the present invention, a pair of rails on a slidable bogie are disposed to ride in a pair of tracks connected to a trailer having spaced openings therein. One or more movable pin elements are disposed to move in or out from the rails to the track openings to lock or unlock the bogie to the trailer. When the pins are inserted in place, they are biased in positions by a mechanical spring. Air pressure is selectively applied to an actuator which overcomes the bias of the mechanical spring to cause the pin elements to unlocked positions out of the openings in the tracks of the trailer. This permits the bogie to be repositioned or removed from the trailer.

Other objects and advantages of the present invention will be apparent and suggest themselves to those skilled in the art, from a reading of the following specification and claims, taken in conjunction with the accompanying drawing, in which:

Figure 1:
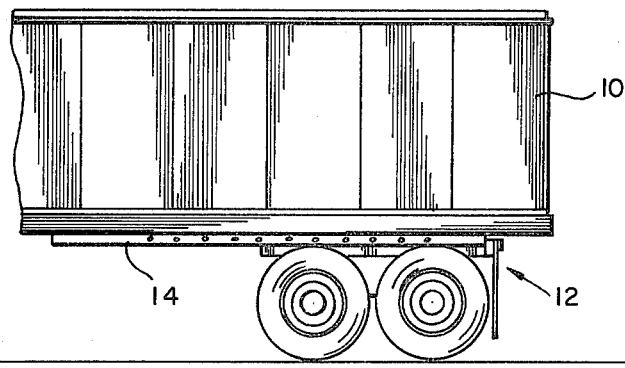
FIG. 1 is a side view, partly broken away, of a trailer secured to a bogie.
Figure 2:
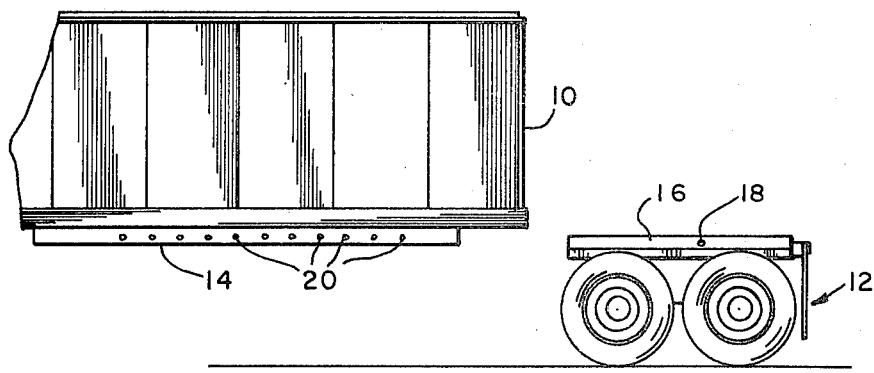
FIG. 2 is a side view, partly broken away, similar to FIG. 1 in which the bogie is separated from the trailer.

Referring particularly to FIGS. 1 and 2, a trailer box or trailer 10 is disposed to ride on a bogie 12. The trailer 10 includes a pair of parallel tracks 14 and 15 (FIG. 3) spaced to receive a pair of parallel rails 16 and 17 (FIG. 3) forming part of the bogie 12. The bogie rail 16 has an opening which includes a retractable pin 18.

During normal operation, the trailer 10 and bogie 12 may be in the positions illustrated in FIG. 1 with the pin 18 of the bogie extended to enter into a selected one of the spaced openings 20 in the track 14 of the trailer. When the pin 18 is extended, the bogie 12 is locked in place to the trailer 10 and the trailer may be operated.

A bogie such as the bogie 12 is generally repositioned from time to time with respect to the trailer 10 to accommodate different loads and turning radius. During the repositioning, the pin 18 is retracted. The trailer 10 may then be moved with the bogie 12 in a braked condition. The rails of the bogie are then free to slide within the tracks of the trailer. When the bogie and trailer are in the desired position, the pin 18 is again extended through a selected one of the openings 20 of the track 14. A spring (not illustrated in FIGS. 1 & 2) biases the pin 18 to maintain it in a locked position with the bogie 12 being secured to the trailer 10.

Figure 3:
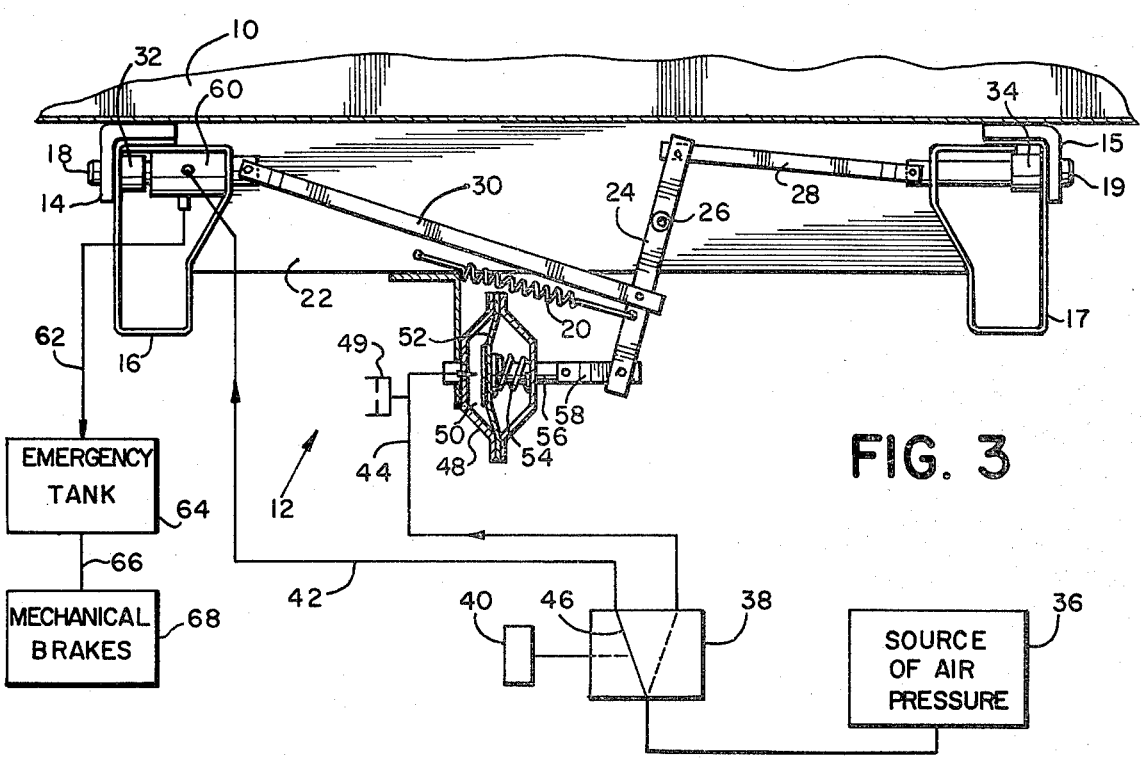
FIG. 3 is an end view taken below the trailer illustrating an actuating mechanism for locking and unlocking the bogie to the trailer.

Referring to FIG. 3, pins 18 and 19 are in locked positions and extend from rails 16 and 17, respectively, through selected openings in tracks 14 and 15, respectively, of the trailer 10. The pins 18 and 19 are biased in position by force produced by a mechanical spring 20 secured at one end to the bogie structure cross beam 22. The other end or free end of the spring 20 is connected to an actuating arm 24.

The actuating arm 24 is pivotally mounted by suitable means to the structure 22 to pivot about the pivot point 26. Lever arms 28 and 30 are pivotally connected to the actuating arm 24 at opposite sides of the pivot point 26. The lever arms 28 and 30 are pivotally mounted to the locking pins 19 and 18, respectively. The pins 18 and 19 extend through bushing or bearing members 32 and 34 secured to rails 14 and 15, respectively.

In the positions illustrated, the spring 20 is biased in tension so that the actuating arm 24 tends to be forced in a clockwise direction to force the lever arms 28 and 30 and their connected pin elements 19 and 18 forward so that the pins 19 and 18 extend through openings in the track 15 and 14. The bogie 12 is secured to the trailer 10 when the elements 19 and 18 are in the positions illustrated.

Because of wear of the various mechanical parts, possible misalignment of the pins with respect to the openings in the tracks, dirt which tends to cause jamming of the movable elements and other reasons, it often becomes impractical to manually remove the pins, such as pins 18 and 19, from the openings in tracks, such as tracks 14 and 15. The present invention is designed to provide power means to remove the pins from the track openings while, at the same time, utilizing many of the parts found in existing trailers thereby making retrofitting relatively easy.

A source of air pressure 36 may be a source such as found in most conventional trailer systems. This may be the pressure normally supplied by a compressor in the tractor when various hose connections are made between the tractor and the trailer. This air pressure, among other things, is applied to an emergency tank in the trailer to overcome the pressure of the mechanical springs which provide parking brakes for the wheels of the bogie after the pressure in the emergency tank reaches a predetermined level dependent upon a valve setting.

Air pressure from the source 36 is applied to a two way valve 38, which may be manually operated by pressing a button 40, for example, to direct the air pressure through a selected one of lines or paths 42 or 44. The pressure path within the valve 38 may include means 46 capable of switching to a position indicated by the solid line to connect the source 36 to the line 42 or to a position indicated by the dashed lines to connect the source 36 to the line 44. Such two way valves may take a wide variety of different forms and may include various diaphragms and pressure chambers, the operation of such valves being well known to those skilled in the art. Such valves may employ electrical solenoids to switch an air passage from one position to another. The source of pressure is normally connected to line 42 except when it is desired to remove the pins from the tracks.

When the valve 38 is switched to a position so that air pressure is directed through a path illustrated by the dashed lines, air pressure from the source 36 is applied to actuating means 48. The actuating means 48 includes a housing having a pressure chamber 50 therein. Pressure in the chamber 50 is exerted against a diaphragm 52. A spring 54 normally biases the diaphragm 52 towards the left when no pressure is applied to the chamber 50. Pressure in the chamber 50 from the source 36 overcomes the spring pressure of spring 54 causing the diaphragm 52 to move forward or towards the right.

An arm 56 is secured to the diaphragm 52 and extends out of the housing of the actuating means 48. The arm 56 is pivotally connected to a lever element 58, which in turn is connected to the end of the actuating arm 24. Movement of the arms elements 56 and 58 towards the right, as when pressure is applied to chamber 50, causes the actuating arm 24 to move counterclockwise about the pivot point 26. When the air pressure is sufficiently high, the holding tension of the mechanical spring 20, which holds the pins 18 and 19 in locked positions in the tracks 14 and 15 is overcome.

When the arm 24 is moved counterclockwise, and the tension of the spring 20 is overcome, the lever arms 28 and 30 will move to retract the pins 19 and 18, respectively, out of the openings in the tracks 15 and 14, respectively. Withdrawal of the pins 18 and 19 out of the openings of the tracks unlocks the bogie 12 from the trailer 10. This permits the bogie 12 to be repositioned with respect to the trailer 10 or separated therefrom.

When the valve 38 is manually switched to a position indicated by the solid line, air pressure is directed from source 36 to the line 42. An orifice 49 in the line 44 relieves the pressure within the chamber 50 automatically when the valve 38 is switched. This orifice leaks pressure at a low rate and assures that the pins are secured in place before the trailer can be operated. No additional switching means are required to accomplish this. The line 42 leads to a housing 60. The pin 18 is disposed to be moved within an opening of the housing 60. Means are associated with the pin 18 to provide a sealed air chamber with the housing 60. When the pin 18 is secured in position the air pressure from the line 42 enters the air chamber and exits to a conduit 62. Air pressure from the conduit 62 is applied to an emergency tank 64. The emergency tank 64 is associated with a valve (not illustrated) which is set at a level so that when the pressure in the emergency tank 64 reaches a predetermined level, pressure is applied through a line 66 to overcome the parking brake pressure provided by mechanical brakes 68.

The pressure of the mechanical brakes 68 normally is used to brake the wheels of the bogie 12. Unless pressure is applied from the emergency tank 64, the trailer cannot be operated. If the pin 18 is not properly inserted within the housing 60, the air chamber for connecting the line 42 to line 62 will be misaligned and no air pressure will be applied to the emergency tank 68 to release the mechanical brakes. This provides a safety feature to assure that the pins are in locked positions before the trailer can be operated and assures that the bogie will not become separated from the trailer during operation as a result of the pins 18 and 19 not being in locked positions.

The details of the safety feature are described in the aforementioned patent application. In an embodiment of the present invention, the safety feature in combination with the power actuation for removal of the pins is important. The reason for this is to assure that an operator, after applying the power to remove the pins, cannot operate the trailer unless he operates the valve 38 to lock the pins in place.

What is claimed is:

1. In combination with a trailer with tracks connected thereto for receiving rails connected to a bogie, with the bogie having structure including a movable pin element disposed to pass from the rails through a selected opening in one of the tracks to lock the bogie in place beneath the trailer during operation, with the pin element being disposed to be removed from the opening in said track when the trailer is being repositioned over the bogie or separated from the bogie when the trailer is not operated,
   a power actuated retracting mechanism comprising:
   a. spring biasing means connected to normally urge said pin element into a locking position from said rail through an opening in at least one of said tracks;
   b. a source of air pressure;
   c. means responsive to said air pressure to overcome the bias of said spring biasing means to move said pin element from said locking position out of the opening of said one track of said trailer; and
   d. means for selectively connecting said source of air pressure to said means responsive to said air pressure.

2. A combination as set forth in claim 1 wherein an actuating arm is connected to said pin element, said spring biasing means being connected between said actuating arm and said structure of said bogie to normally urge said pin element through said one opening in said track.

3. A combination as set forth in claim 2 wherein said means responsive to said air pressure comprises an air chamber for receiving air pressure to actuate a lever arm connected to said actuating arm.

4. A combination as set forth in claim 3 wherein a two position valve is connected to said source of air pressure, said valve being switchable to connect said air pressure from said source through a first path to said air chamber or through a second path.

5. A combination as set forth in claim 4 wherein said second path includes apparatus for receiving air pressure from said source to overcome the parking brake pressure to permit said trailer to be operated only when said pin element is extended through an opening in said one of said tracks to lock said bogie to said trailer.

6. A combination as set forth in claim 5 wherein a pair of pin elements are provided with one pin element extending into each of said tracks.

7. A combination as set forth in claim 6 wherein manually operated means are provided in said valve to permit an operator to selectively switch said source of air pressure to said first or second path.

8. A combination as set forth in claim 7 wherein an orifice is provided to automatically relieve pressure in said air chamber when said two-way valve is switched to said second path.

* * * * *